United States Patent [19]

Stumpf

[11] 4,279,559
[45] Jul. 21, 1981

[54] SUPPORT INSTALLATION FOR LARGE CYLINDRICAL LOAD UNITS, PARTICULARLY LARGE TUBES

[76] Inventor: Karl Stumpf, Goethestrasse 1, 4000 Dusseldorf, Fed. Rep. of Germany

[21] Appl. No.: 12,939

[22] Filed: Feb. 16, 1979

[30] Foreign Application Priority Data

Feb. 18, 1978 [DE] Fed. Rep. of Germany ....... 2806959
Jan. 11, 1979 [DE] Fed. Rep. of Germany ....... 2900820

[51] Int. Cl.³ .............................................. B65G 39/14
[52] U.S. Cl. .................................. 414/431; 414/433; 414/529; 193/35 B; 193/37
[58] Field of Search .................. 414/431–433, 414/502, 529; 198/127 R, 379, 412, 20 R; 114/238; 308/3 R, 3 A; 193/35 B, 35 MD, 37

[56] References Cited

U.S. PATENT DOCUMENTS

| | | | |
|---|---|---|---|
| 2,216,504 | 10/1940 | Sekulski | 193/35 B |
| 3,363,735 | 1/1968 | Hotchkiss | 193/37 |
| 3,621,961 | 11/1971 | Stumpf | 193/37 |
| 3,645,379 | 2/1972 | Kornylak | 193/37 R |
| 3,710,917 | 1/1973 | Black | 198/127 R X |
| 3,874,491 | 4/1975 | Faure | 193/35 MD |
| 3,961,694 | 6/1976 | Murakami | 193/37 |

FOREIGN PATENT DOCUMENTS

| | | | |
|---|---|---|---|
| 502510 | 6/1930 | Fed. Rep. of Germany | 193/37 |
| 2624162 | 1/1977 | Fed. Rep. of Germany | 193/37 |

*Primary Examiner*—Leslie J. Paperner
*Assistant Examiner*—Terrance L. Siemens
*Attorney, Agent, or Firm*—Schwartz, Jeffery, Schwaab, Mack, Blumenthal & Koch

[57] ABSTRACT

A support installation is provided for use with large, cylindrical loads to provide rotational and longitudinal movement therefor. The support includes a plurality of non-driven all-round rolls and at least one driven all-round roll, the principal rotational axes of the non-driven rolls being parallel to the load and the rotational axis of the driven roll being perpendicular thereto. The rolls engage the circumference of the load for rotational and longitudinal movement. A U-shaped bracket fixedly or yieldably supports the rolls.

6 Claims, 7 Drawing Figures

SUPPORT INSTALLATION FOR LARGE CYLINDRICAL LOAD UNITS, PARTICULARLY LARGE TUBES

BACKGROUND AND PRIOR ART

The invention relates to a support installation for large cylindrical load units, particularly large tubes. Specifically, the installation permits the rotation and axial displacement of cylindrical load units and is equipped with rolls arranged on two rotating axles parallel to the axis of the load units. The axles are spaced an axial distance from each other, which distance is less than the diameter of the load units. At least one of the axles is capable of being driven.

The invention originated from a problem arising during the testing of large tubes, wherein the tubes, for the purpose of testing their welded joints, must be both rotated and moved forward in the axial direction. Load support devices will crowned rolls are known for this application; their axles are essentially parallel to the axis of the large tubes, and the latter may therefore be rollingly displaced with rotation on these rolls. In order to obtain a transporting effect in the longitudinal direction, the crowned rolls may be set at a slight angle with respect to the axis of the large tubes. This results in a reeling effect and thus advances the tubes.

The disadvantage of this prior art device consists of the fact that the angle setting device for the entirety of the rolls requires a considerable structural effort, and the installation is therefore expensive. Further, the longitudinal transport of the tubes takes place not by pure rotation, but it involves friction between the rolls and the surface of the tubes which may result in the marking of the surface of the tubes. In the situation where the tubes have a poor surface quality, e.g. those carrying scale on their surface, this condition is immaterial. However, on tubes with higher surface qualities, for example smooth tubes of corrosion resistant steels, such markings are extremely undesirable.

OBJECTS AND SUMMARY

It is therefore an object of the invention to provide a load supporting installation of the above-mentioned type capable of supporting large cylindrical load units in a purely rolling motion and allowing both rotation and longitudinal movement.

This object is attained according to the instant invention by designing the rolls in the form of first all-round rolls, already known in the art, having their principal axes parallel to each other. Second all-round rolls having their principal axes perpendicular to the principal axes of the first all-round rolls are also provided, the second all-round rolls being driven and engaging the cylindrical load units at their circumference.

"All-round rolls" consist of a disk rotating around its axis, the principal axis, with a plurality of small barrel-shaped rolls being arranged rotatably with their axes perpendicular to the axis of the disk, at the circumference of said disk. The external circumferences of the small barrel-shaped rolls are located on a common circular surface, and contact between the small barrell-shaped rolls and the circular cylinder surface exists substantially over the entire circumference of the circular cylinder surface. These rolls are capable of rotation around the principal axis. In the process, the weight rests on the circumferences of the small barrel-shaped rolls, but these are not rotating. Because the small barrel-shaped rolls cover the entire circumference of the circular cylinder surface, smooth rolling without impact takes place, as in the case of a conventional wheel. However, the load is also capable of moving in a direction parallel to the principal axis, whereby the barrel-shaped rolls rotate in their bearings on the circumference of the disk. Obviously, both motions may take place simultaneously, so that a load supported on an all-round roll may be displaced without resistance and with a purely rolling support in all directions. Such all-round rolls are known, for example, from British Pat. No. 1,225,609. Heretofore, they were essentially arranged in a plurality and in a single surface, thus forming conveyors or run-out tables, such as, for example described in German Published Application No. 25 15 009.

British Pat. No. 976,587 discloses a winding device wherein the winding rollers are provided with barrel-shaped rolls over their entire surface, the barrel-shaped rolls rotating around axes located in planes normal to the axes of the winding rollers. The sheet material to be wound may thus be entrained by the rotation of the winding rollers without the rotation of the barrel-shaped rolls and may be moved axially for feeding by the winding rollers with the barrel-shaped rolls rotating, whereby, however, a separate feed advance device is provided which engages the end of the sheet material to be wound.

In the present invention, on the other hand, the favorable effect is obtained by means of the cooperation of all-round rolls, both during the rotating feed advance and the longitudinal advance with retaining a support which is purely of a rolling nature. The all-round rolls supporting the unit of load during rotation are disposed with their principal axes exactly parallel to the axis of the load unit so that satisfactory conditions for rotation exist. The drive in the longitudinal direction is provided by the all-round rolls offset by 90 degrees, again under conditions of pure rolling. As a result, no markings on the load are produced. No setting of the rolls to obtain different relationships of rotation and longitudinal advance is required. The all-round rolls may therefore be fixedly mounted. This substantially reduces the cost of the structure. It is merely necessary to let the drives for the rotation and the longitudinal advance run at higher or lower velocities.

The mutual disposition of the all-round rolls for rotation and longitudinal advance is funadamentally arbitrary. It is preferred, naturally, to arrange both at approximately the same height so that advantageously compact installation may be obtained.

It is further important that the advance of the load units does not require devices performing strokes, which in relation to their length would have to be adjusted to the length of the load unit or the stroke desired at the moment. The load support installation therefore may be used in the case of infinitely long cylindrical load units.

It is advisable to arrange each all-round roll in its own roll block. These blocks may be prefabricated on an assembly line and mounted in a simple manner on a suitable foundation at the distances from each other required by the individual application.

The invention also includes roll blocks characterized by a U-shaped bearing bracket, whereby the all-round roll is bearingly supported between the legs of the bracket, the latter being mounted by its bight on one cross section of an I-beam, with the other cross section of the I-beam containing fastening devices for the all-round roll.

In actual practice, the large tubes, the manipulation of which represents the preferred application of the invention, are not of an ideal cylindrical configuration, but deviate from the cylindrical configuration within a certain range of tolerances.

It has been found the operating performance of the support installation according to the invention can be improved significantly if the all-round rolls are yieldingly supported.

Such a measure has the effect that impacts within the support installation are substantially cushioned and also that in the case of somewhat irregularly shaped external sides of the large tubes, a satisfactory contact surface is always maintained on the all-round rolls so that the driving all-round rolls may have an improved grip.

The yielding support of the all-round rolls may be effected by providing the roll blocks themselves with supports according to weight.

One embodiment, highly successful in actual practice, consists of the roll blocks being arranged on beams supported bearingly and rotatably around an axis parallel to the principal axis of the all-round rolls and on a yielding buffer at the other end.

BRIEF DESCRIPTION OF THE DRAWINGS

The above and other objects of the invention will become apparent from the following description and attached drawings wherein.

DETAILED DESCRIPTION OF INVENTION

Figure 1:
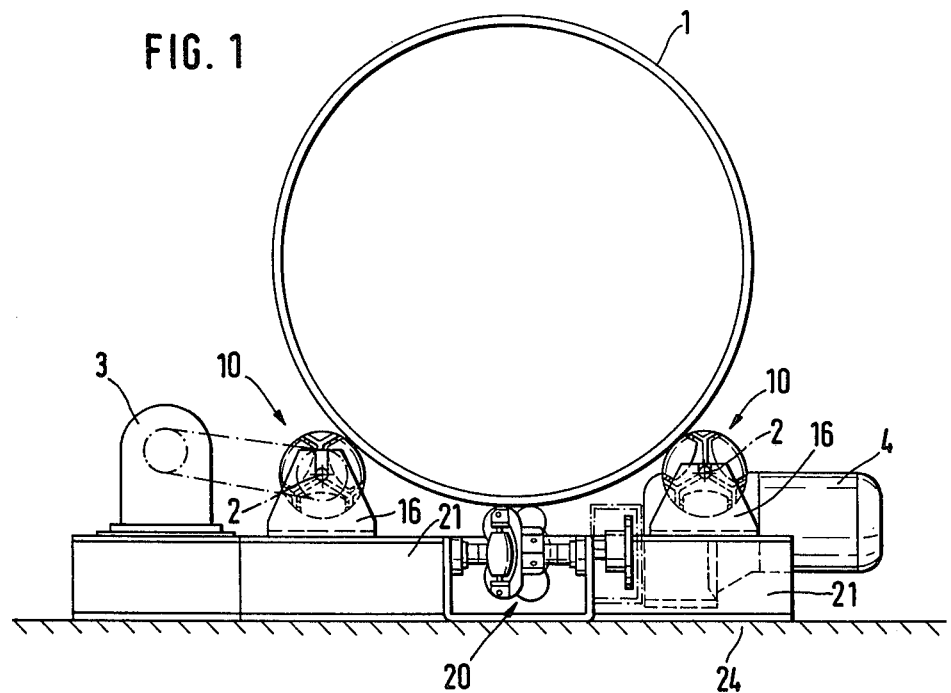
FIG. 1 shows a cross section of the support installation of the invention.
Figure 4:
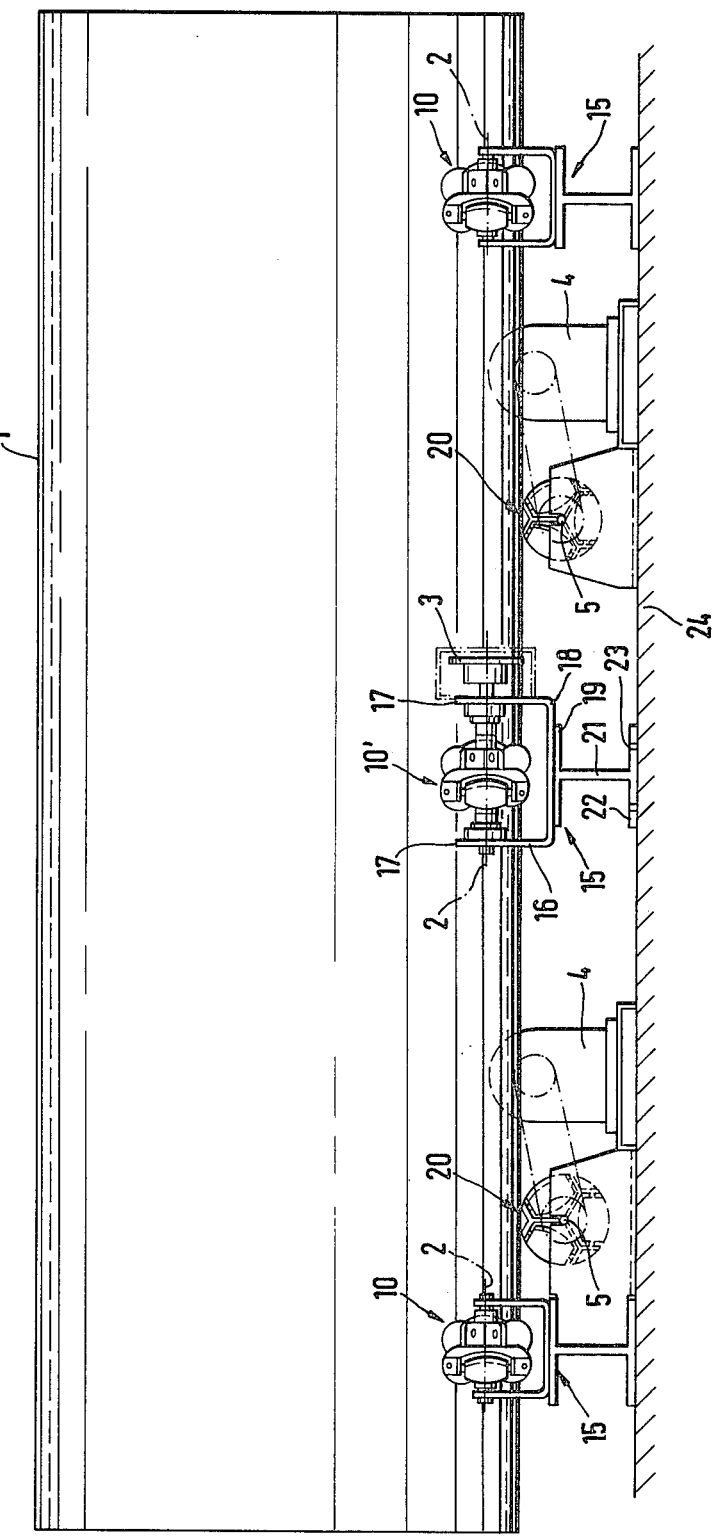
FIG. 4 shows a side elevation of the support installation in its entirety.
Figure 5:
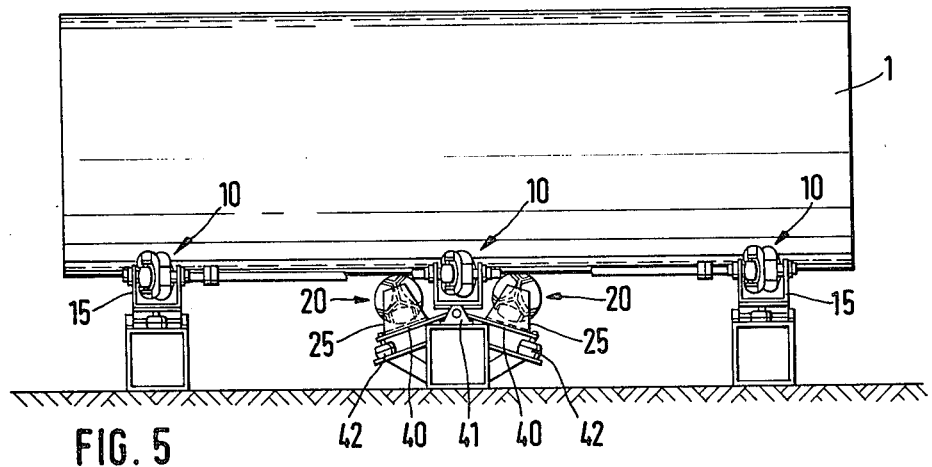
FIG. 5 shows a corresponding side elevation of a modified form of the invention.
Figure 6:
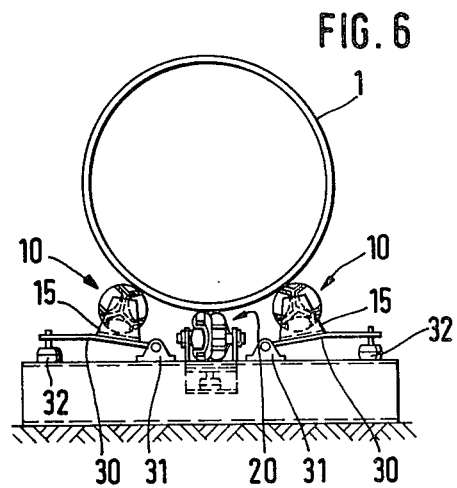
FIG. 6 shows an end view of the installation of FIG. 5 from the left.
Figure 8:
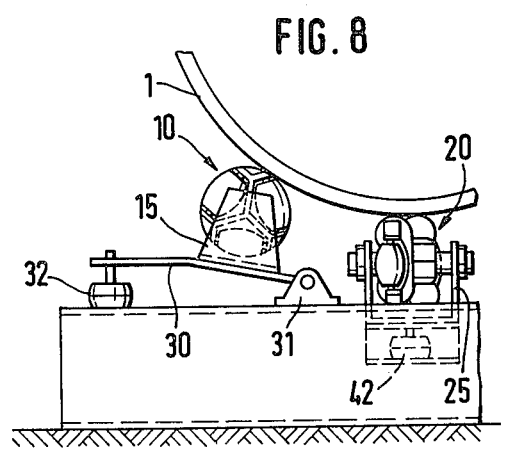
FIG. 8 shows an enlarged partial view of FIG. 6.
Figure 7:
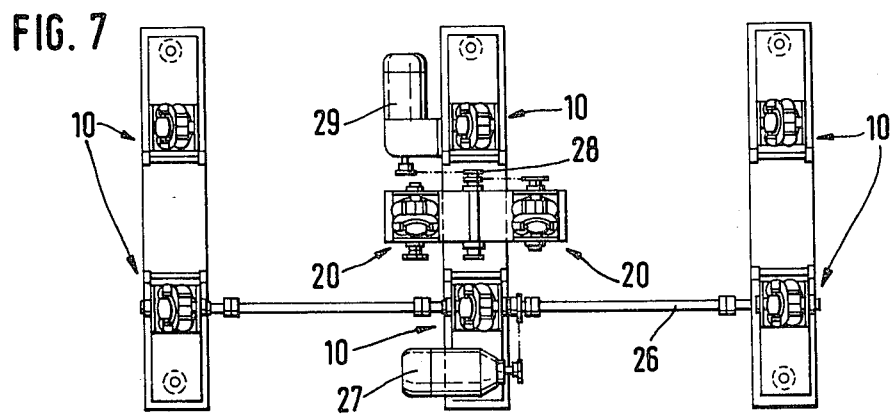
FIG. 7 shows a top view of the support installation of FIG. 5.

Referring to FIG. 1, a large tube 1 is rotatingly supported on a plurality of non-driven all-round rolls 10, the rolls having principal axes 2 parallel to the axis of the large tube 1. As illustrated in FIG. 4, three pairs of oppositely located all-round rolls 10 are provided successively, at intervals along the axis of the large tube 1. An all-round roll 10, located intermediately in FIG. 4, is driven by means of a drive 3 and rotates the large tube 1 upon demand.

In addition to the all-round rolls 10 having their axes of rotation parallel to the axis of the large tube 1, one or a plurality of additional rolls 20 are provided. The rolls 20 are arranged in the instant embodiment underneath the large tube 1 and driven by means of a drive 4. The principal axes 5 of the driven all-round rolls 20 are normal to the axis of the large tube 1 so that during the rotation of the all-round rolls 20 around the axis 5, a feed advance in the direction of the tube axis takes place.

Figure 2:
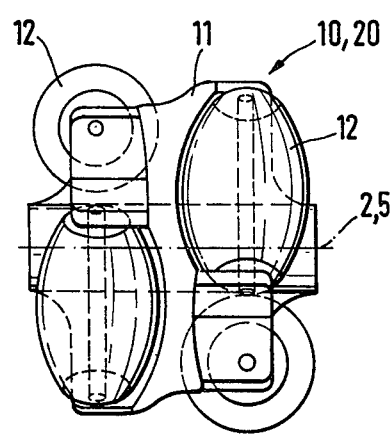
FIG. 2 shows a side elevation of one set of all-round rolls members.
Figure 3:
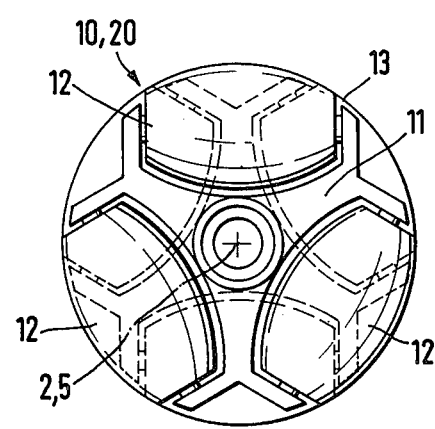
FIG. 3 shows a front elevation of an all-round roll.

The all-round rolls, 10, 20, together with their conventional bearings and drives represent in their entirety the support installation according to the invention. The design of the all-round rolls 10, 20 may be seen in detail in FIGS. 2 and 3. The all-round rolls 10, 20 comprise a disk 11 arranged on the principal axis 2, 5 with small barrel-shaped rolls 12 having axes perpendicular to the principal axis 2, 5, located on the circumference of the disk 11. In the example of the present embodiment, three barrel-shaped rolls are provided on each side of the disk. The external circumferences or generatrices of the rolls 12 of an all-round roll 10, 20 are located mathematically, on a common circular cylinder surface, which may be represented by the external outline of the all-round rolls 10, 20, in FIG. 3. The barrel-shaped rolls 12 are dimensioned so that around the circumference of the all-round roll 10, 20 and the disk 11 contact with the circular cylinder surface exists. In this manner, the all-round rolls 10, 20 are able to support the goods to be transported so that the goods may be displaced by rolling both along contact lines given by the generatrices of the barrel-shaped rolls 12 during the rotation of the all-round rolls 10, 20 around the principal axis 2, 5, and also parallel to the principal axis 2, 5 by means of the rotation of the barrel-shaped rolls 12.

The diameter of the all-round rolls 10, 20, i.e., the diameter of the external circular cylinder surfaces 13, need not coincide. For example, the diameters of the all-round rolls 10, 20, transmitting the driving force, may be chosen to be somewhat larger.

In order to improve the transfer of the driving forces and to better protect the surface of the tubes, on all or some of the all-round rolls 10, 20, the barrel-shaped rolls 12 may be covered with rubber or plastic.

All of the all-round rolls 10, 20 are bearingly supported in their own roll blocks 15, 25. These units may be prefabricated and mounted on a foundation at the required intervals. The roll blocks 15, supporting rotation, comprise a U-shaped bearing bracket 16 (FIG. 4), carrying between a pair of legs 17 the all-round roll 10 and being fastened by a bight 18 to an upper transverse web 19 of an I-beam section 21. The beam section has a lower transverse web 22 with a plurality of mounting holes 23 for securing to a foundation or a bottom plate 24.

In FIGS. 5 to 8, a modified form of the invention is represented, wherein the supporting rolls 10, 20 are themselves yieldably supported. The roll blocks 15 of the all-round rolls 10, effecting the rotation, and the blocks 25 of the all-round rolls 20, providing the forward motion, are arranged on beams 30 and 40, respectively. The beams are pivoted at one end on a plurality of stationary bearings 31 and 41, respectively, and yieldingly supported at the other ends thereof by means of buffers 32 and 42, respectively. The buffers 32, 42 are commercially available rubber-metal elements. The axes of the bearings 31, 41 extend parallel to the principal axis of the associated all-round rolls 10, 20.

The all-round rolls 10 of one side are aligned with their principal axes and are connected with each other by means of a shaft 26 and driven together by a motor 27. The beams 40 of the all-round rolls 20, providing the forward motion, have a common rotating axle and are driven by means of chain pinions 28 mounted on the axle, together with a motor 29. Because of the yielding nature of the bearings of the all-round rolls 10, 20, impacts are attenuated, and the weight to be supported is distributed uniformly over the all-round rolls 10, 20, so that satisfactory contact of the driven all-round rolls is assured at all times.

What is claimed is:

1. A support installation for use with large, cylindrical loads to provide rotational and longitudinal movement for the load comprising:
   (a) a plurality of non-driven all-round rolls arranged on two principal rotational axes at intervals, along the length of the load, said rotational axes being at approximately the same height and parallel to the axis of the load and being located at a distance from each other which is less than the diameter of the load;
   (b) a driven all-round roll having a principal rotational axis displaced longitudinally along the length of the load relative to said non-driven rolls;
   (c) the driven roll principal axis being substantially normal to the principal axes of the non-driven rolls;
   (d) said rolls engaging the circumference of the load; and
   (e) means for yieldingly supporting at least some of said all-round rolls.

2. A support as defined in claim 1 wherein each roll is positioned in a roll block.

3. A support as defined in claim 2 where in said roll block comprises a U-shaped bearing bracket, said bracket having a pair of legs, an all-round roll positioned between said legs, a bight connecting said legs and forming means for mounting said bracket.

4. A support as defined in claim 3 including an I-shaped beam, said bight being mounted on one transverse portion of said beam, and means for fastening said beam to a foundation being positioned on the outer transverse portion.

5. A support as defined in claim 2 wherein said roll blocks are yieldingly supported.

6. A support as defined in claim 5 including a beam pivoted at one end on an axis parallel to the axis of the all-round roll and supported at the other end on a resilient buffer, said block being positioned on said beam.

* * * * *